United States Patent [19]

Mehrtens

[11] 4,034,480
[45] July 12, 1977

[54] VISUAL DESCENT SIGHTING DEVICE FOR AIRCRAFT

[76] Inventor: William R. Mehrtens, 81 Remsen Circle, Yonkers, N.Y. 10710

[21] Appl. No.: 600,633

[22] Filed: July 31, 1975

[51] Int. Cl.² .................................. G01C 21/00
[52] U.S. Cl. ........................... 33/264; 33/227; 33/277; 33/286; 35/12 N
[58] Field of Search ............ 33/227, 263, 264, 276, 33/277, 286; 35/12 N, 12 S; 116/124 R, 124 C, 28 R

[56] References Cited

U.S. PATENT DOCUMENTS

| | | | |
|---|---|---|---|
| 1,349,277 | 8/1920 | Honig | 33/227 |
| 1,963,826 | 6/1934 | Chilton | 356/247 |
| 2,280,126 | 4/1942 | Metcalf | 33/227 |
| 2,412,585 | 12/1946 | Klemperer et al. | 33/227 |
| 2,517,779 | 8/1950 | Flint | 356/247 |
| 2,722,054 | 11/1955 | Fisher | 33/277 |
| 2,975,400 | 3/1961 | Ferguson et al. | 33/227 |
| 3,190,585 | 6/1965 | Busch et al. | 244/75 |

Primary Examiner—Richard E. Aegerter
Assistant Examiner—Richard R. Stearns
Attorney, Agent, or Firm—Pennie & Edmonds

[57] ABSTRACT

This invention relates to a self-contained sighting device for use in aircraft that will give visual descent guidance to the pilot while making his final approach to a runway for a landing. The device comprises frames or windows that sight along an imaginary approach path which automatically directs the pilot's line of sight to parallel the desired approach path thereby aiding the pilot in his approach to the intended landing spot.

7 Claims, 5 Drawing Figures

VISUAL DESCENT SIGHTING DEVICE FOR AIRCRAFT

BACKGROUND OF THE INVENTION

The approach to a runway is one of the most critical and potentially dangerous parts of flying for it is at this time that the aircraft must be flown close to the ground at an attitude (pitch) and air speed very near its stalling point. This fact shows up in the relatively high rate of stall-pin accidents during this phase of the flight.

At present, there is an Instrument Landing System that provides a means of vertical descent guidance. This is the glide slope, a component of the Instrument Landing System which requires the use of highly sophisticated airborne and ground-installed equipment. The only visual aid for pilots is the Visual Approach Slope Indicator (V.A.S.I.) System which is a ground-installed device which uses different colored lights to define predetermined visual approach paths while descending to the runway. It provides the same information visually that the glide slope unit provides electronically. The V.A.S.I System is installed only at relatively few of the larger airports and even then is available only when a particular runway is being used.

For all practical purposes, the average pilot, particularly in smaller aircraft, has no visual aids available for descent guidance when making an approach to a runway and must rely solely on his own experience and judgement. To properly judge an approach, the pilot must sight along an imaginary approach path that forms an angle between the horizon and his line of sight when viewing the desired landing spot. The aircraft is then flown parallel or down the imaginary path to the runway. Convection currents, wind gusts, and terrain features are a few of the unknowns that often cause a pilot to misjudge his approach and miss his landing spot. When making a visual approach to a runway for a landing, the pilot uses the apparent motion of objects on the ground as a guide in judging his descent. However, all objects that move downward will be overshot and all objects that move upward towards the horizon will be undershot. The stationary spot or point of no motion is where the aircraft will land if the flight path is continued unchanged.

It is an object of the present invention to provide a sighting device that frames the desired landing spot within a small area so that the apparent motion is more easily detected and permits the pilot to control his descent in order to make an accurate approach to his desired landing spot.

It is an object of the present invention to provide a self-contained sighting device that is simple and easy to use and independent of any ground-installed equipment, requiring little or no in-flight adjustments to permit the pilot to make a safe approach to a landing site.

It is a further object of the present invention to provide a sighting device that can be preset to indicate a predetermined visual approach path or corridor, permitting a safe landing at any airport or landing site.

It is still further an object of this invention to provide a glide indicator sighting device that employs sighting frames or windows instead of the conventional front and rear sights that require too much of the pilot's attention that will allow the pilot to quickly and easily determine the proper position to begin his descent while automatically directing the pilot's line of sight to parallel the desired approach path.

It is still further an object of this invention to provide a sighting device that will provide an airborne reference point to aid the pilot in his descent to a landing spot while indicating a preset angle of approach regardless of the attitude of the aircraft.

BRIEF DESCRIPTION OF THE INVENTION

This invention relates to a glide indicator sighting device for use in aircraft for landing purposes that provides a convenient airborne reference point to detect apparent motion of ground objects while aiding the pilot in his approach to the intended landing spot. The pilot's field of vision encompasses a large area of the landing surface and while this is a desirable and necessary condition for reasons of safety, such as maintaining a visual contact with other landing traffic, the large field of vision makes it difficult to detect the apparent motion of objects on the ground and to locate and maintain a stationary spot for landing on a runway. By framing the landing spot in a relatively small area of the pilot's field of vision, the apparent motion is more easily detected and the pilot is better able to maintain the landing spot in a stationary position thereby permitting an accurate approach to the desired landing spot.

The sighting device according to this invention is a three-dimensional ladder structure that, in its simplest form, consists of a number of horizontal sighting plates of minimum thickness parallel, equally spaced and positioned one above the other. These horizontal sighting plates are attached to vertical members thereby forming a number of sighting windows in a vertical arrangement. This vertical arrangement of the sighting windows allows the pilot to view the landing spot through a sighting window regardless of his eye level and eliminates the need for any vertical adjustments that would normally be required if a single sighting window were used. The device is mounted directly in front of the pilot in his line of sight on the glare shield of the aircraft and in viewing the landing area, the sighting windows appear only as a transparent shadow image superimposed over the landing area and framing the desired landing spot in a relatively small field of vision.

BRIEF DESCRIPTION OF THE DRAWINGS

FIG. 1b is a modification of the sighting section shown in FIG. 1a.

FIG. 1c is another modification of the sighting section shown in FIG. 1a.

DESCRIPTION OF THE PREFERRED EMBODIMENT

Figure 1A:
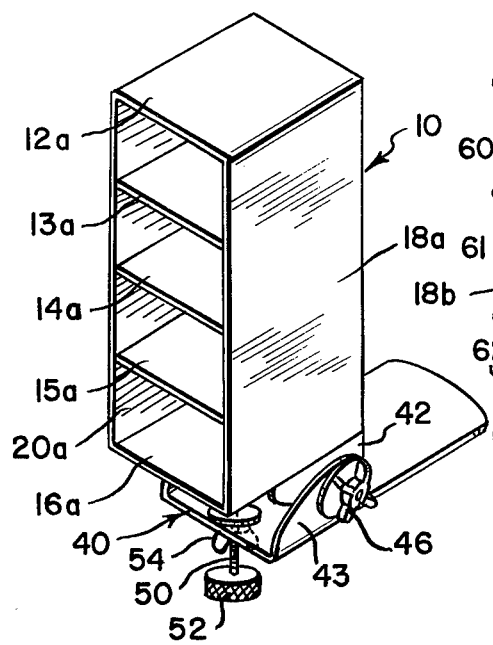
FIG. 1a is a prospective view of the present invention showing the sighting section as it would be mounted on the glare shield of an aircraft.
Figure 3:
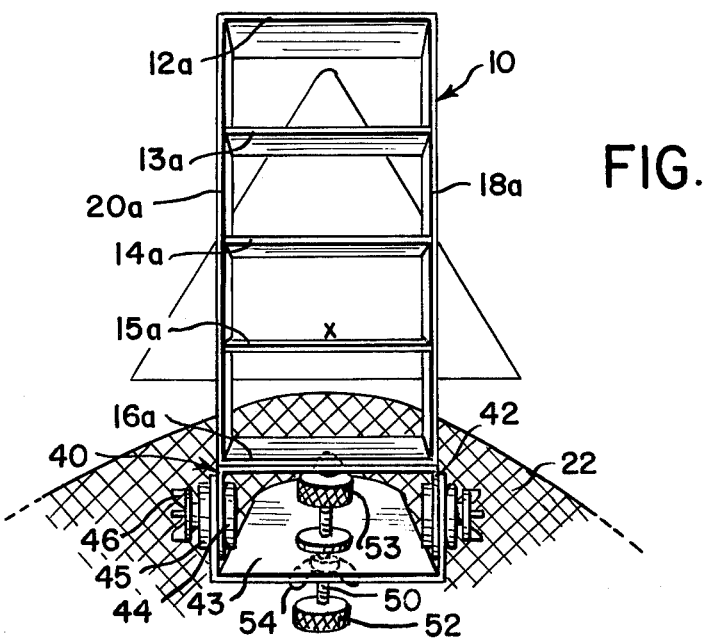
FIG. 3 is a front view of the invention as seen by the pilot when viewing the landing spot at the correct angle.

Referring now to the drawings, wherein like reference characters designate like or corresponding parts throughout the several views, there is shown in FIG. 1a a three-dimensional ladder-type structure 10 consisting of a number of horizontal sighting plates 12a, 13a, 14a, 15a, and 16a of minimum thickness parallel, equally spaced and positioned one above the other. These horizontal sighting plates are attached to vertical side members 18a and 20a forming a number of sighting windows in a vertical arrangement. This vertical arrangement of the sighting windows allows the pilot to view the landing spot through sighting windows regardless of his eye level, and eliminates the need for any vertical adjustments that normally would be required. As shown in FIG. 3, the device is mounted on the glare shield 22 of th aircraft directly in front of the pilot in his line of sight, and when viewing the landing area, the sighting windows appear only as a transparent shadow image 24, 26, 28 and 32 superimposed over the landing area 34 and framing the desired landing spot $x$ in a relatively small field of vision. The landing spot $x$ framed by the sighting windows becomes the airborne reference point that the pilot 35 needs to make an accurate apporach to the intended landing spot $x$ on landing area 34.

Figure 2:
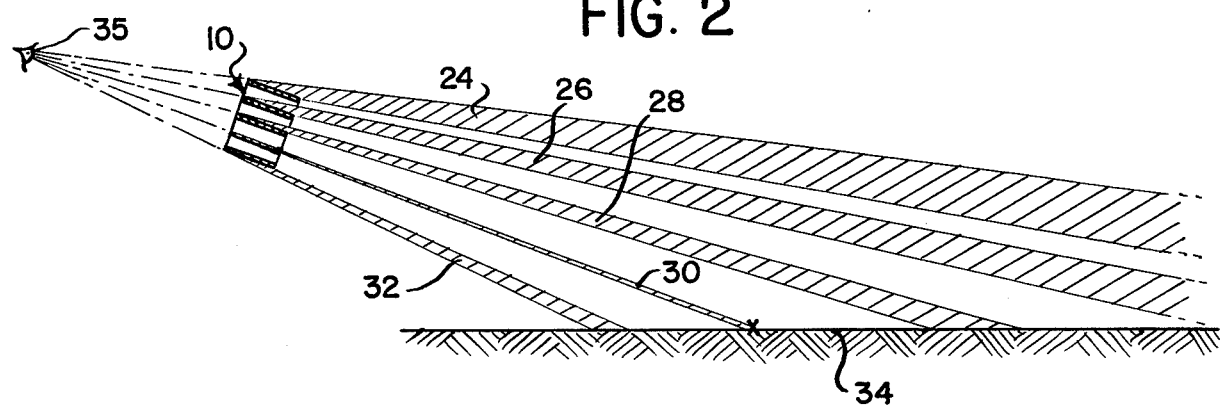
FIG. 2 is a diagramatical side elevation view illustrating an example of the invention framing the landing spot in a stationary position for the pilot.

The horizontal plates 12a, 13a, 14a, 15a, and 16a will be seen as shadows or areas 24, 26, 28, and 32 of various sizes or thicknesses depending upon the viewing angle. When a window is parallel to and in the line of sight of the pilot, there is no shadow as depicted by line 30 in FIG. 2. The farther away the sighting plates are from the line of sight, the greater the shadow becomes as shown by shadow area 24. This shadow effect will direct the pilot to the proper sighting window as shown in FIG. 3, which is the one with the least amount of shadow 30 or window obstruction and having the appearance of being open. All other sighting windows will appear in various stages of closure with varying amounts of shadows 24, 26, 28, and 32. The pilot 35 can now frame his landing spot in the open window and by controlling his descent proceed to fly his aircraft through the open window to reach his landing spot $x$.

If the landing spot $x$ appears to move upward in the sighting window, the aircraft is descending too fast and will land short of the spot. The pilot will increase power to reduce the rate of descent and return to the proper approach path. If the landing spot appears to move downward in the sighting window, the approach is too shallow and the pilot will reduce power to increase the rate of descent and again return to the proper approach path. As long as the landing spot $x$ appears motionless in the sighting window, the aircraft's rate of descent is correct and the desired landing spot will be reached.

The sighting section 10 as shown in FIG. 1a is attached to a hinge-type base section generally denoted by 40 as shown in FIGS. 1a and 3 and consists of an upper frame member 42 connected to lower stationary frame member 43 by bolt 44, washer 45, and wing nut 46 or other similar hinge-type connecting apparatus providing a means for movably positioning the sighting section so as to provide rotation on a horizontal axis perpendicular to the longitudinal axis of the aircraft. With this means of rotation, the horizontal sighting plates 12a to 16a are adaptable to a preset angular position paralleling a desired approach path in the pilot's line of vision. It also permits a horizontal storage position when the sight is not in use. To return the sight from the storage position to the preset angular position, an adaptable stop is provided using a rod 50 threaded through the lower stationary frame member 43 and held in position by threaded clip not shown. The adjusting knob 52 is rotated to raise or lower indexing stop 53 on the upper end of the rod 50 restricting the downward travel of the upper frame member 42. A locking means such as wing nut 54 on rod 50 locks the indexing cap 53 in position.

Figure 1B:
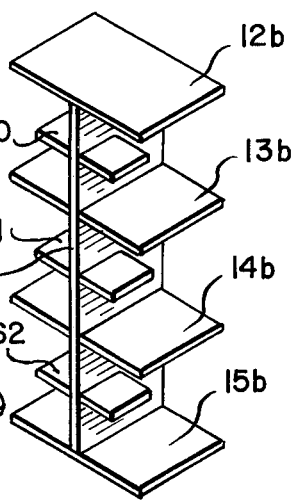

While two vertical members 18 and 20 have been shown, a device having only one vertical post member 18b with the horizontal sighting plates 12b to 15b extending across the vertical members as shown in FIG. 1b is an alternative arrangement.

Figure 1C:
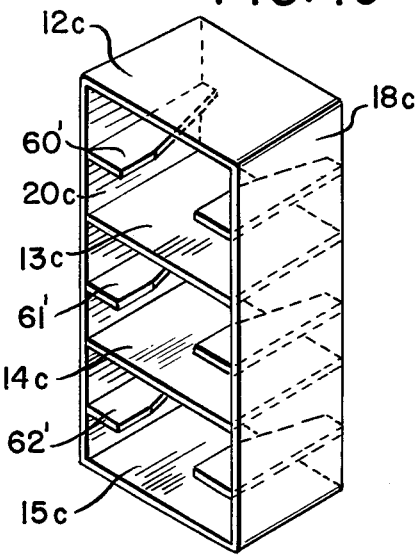

In the preferred embodiment, the sighting section as shown in FIGS. 1b and 1c includes secondary horizontal stub plates 60, 61, and 62 (FIG. 1b) which are attached to a vertical member 18b and plates 60', 61', and 62' (shown in FIG. 1c) which are attached to the vertical side members 18c and 20c. The horizontal stub plates extend from either side of the vertical side members 18c and 20c as shown in FIG. 1c or from the vertical post member 18b as shown in FIG. 1b, and are equally spaced between the horizontal sighting plates 12 and 16.

Due to the effects of binocular vision, the vertical members appear as a vertical line image within the sighting section. This vertical line image is a guide to runway alignment and due to the effects of binocular vision, the secondary horizontal stub plates will appear as a horizontal line in the center of the sighting window. Such horizontal line image is also used for guidance to the desired landing spot and with this arrangement the sighting window will appear to have both vertical and horizontal reference lines.

In the preferred arrangement, the device is stabilized on a horizonal plane by using a vertical-seeking gyroscope. The horizontal sighting plates will describe any preset angle within the horizontal and indicate any desired approach angle within the safe limits of the aircraft, regardless of changes in the aircraft's attitude due to flap gear or power settings. This preferred arrangement will indicate to the pilot the exact position at which to begin the descent, regardless of altitude and with no in-flight adjustments necessary.

The angle of the desired approach path will depend on factors such as the type of aircraft, terrain, obstructions, length of runway, and noise abatement programs. With this invention, the pilot is completely independent of any ground-installed devices or equipment. The present invention also requires no unusual flying attitudes or excessive angles of attack. The present invention is also used only for approach guidance and the landing that follows is completed in a normal manner. In addition, the simple arrangement of the sighting windows as disclosed by this invention eliminates the need for numerous sighting points and arrangement thereof as required by previous devices.

The present invention, using sighting windows, as proposed, permits a clear view of the landing spot and requires little or no adjustments for speed, density, temperature, and other variables nor does the present invention require estimates of altitude or distance as it uses angular measurements only.

Devices of this invention present an unobstructed view of the landing spot $x$ in order that the pilot can view the landing spot within a small area while at the same time viewing the complete area within his normal field of vision.

Moreover, the present invention does not require lenses or projected optical images and uses no material or parts that will cause reflection or glare while providing an inexpensive device adaptable to all types of aircraft, including gliders. The present invention has been found to be particularly adaptable for student training because it gives immediate indications of changes in attitude (pitch) or in the descent angle of the aircraft.

Instruments such as the airspeed indicator and the vertical speed indicator have an instrument lag from 6 to 9 seconds. They only indicate what the aircraft was doing in the past 6 to 9 seconds, rather than what it is doing at the present time.

Naval student pilots practicing aircraft carrier landings must overcome the difficult situation of descending over water and landing on a moving target. Using the present invention, both these difficult situations are simplified in that an airborne reference point is supplied and the moving target is held stationary in the sighting window.

The present invention could save many expensive hours of approach and landing practice.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A visual descent sighting device for aircraft to provide visual descent guidance to a pilot during landing comprising means for defining parallel sighting windows that are spaced an equal distance apart, said means having a three-dimensional ladder-type structure with at least two horizontal sighting plates, and at least one vertical member connected to said horizontal sighting plates and means for mounting said sighting windows on said aircraft in order that a landing area can be framed in a relatively small field of vision.

2. The sighting device claimed in claim 1 wherein said vertical member is comprised of two vertically aligned members and said horizontal sighting plates are connected therebetween.

3. The sighting device claimed in claim 2, including secondary horizontal plates spaced equally between the horizontal sighting plates providing a guide for a visual runway landing alignment.

4. The sighting device claimed in claim 3 wherein the secondary horizontal plates are connected to the vertical members but do not extend between the vertical members.

5. The sighting device claimed in claim 1 wherein said aircraft includes a glare shield and said mounting means is adapted to be affixed on said shield.

6. The sighting device claimed in claim 5 wherein said mounting means includes means for movably positioning said sighting device about a horizontal axis perpendicular to the longitudinal axis of the aircraft.

7. The sighting device claimed in claim 1 wherein said vertical member is connected to said horizontal sighting plates to form sighting windows on either side of said vertical member.

* * * * *

UNITED STATES PATENT AND TRADEMARK OFFICE
CERTIFICATE OF CORRECTION

PATENT NO. : 4,034,480
DATED : July 12, 1977
INVENTOR(S) : William R. Mehrtens

It is certified that error appears in the above-identified patent and that said Letters Patent are hereby corrected as shown below:

```
In column 1, line 11, "stall-pin" should read
--stall-spin--.

In column 3, line 11, "of th aircraft" should read
--of the aircraft--.

In column 4, line 19, "12 and 16" should read
--12 to 16--.
```

Signed and Sealed this

Eighth Day of November 1977

[SEAL]

Attest:

RUTH C. MASON
*Attesting Officer*

LUTRELLE F. PARKER
*Acting Commissioner of Patents and Trademarks*